May 21, 1963

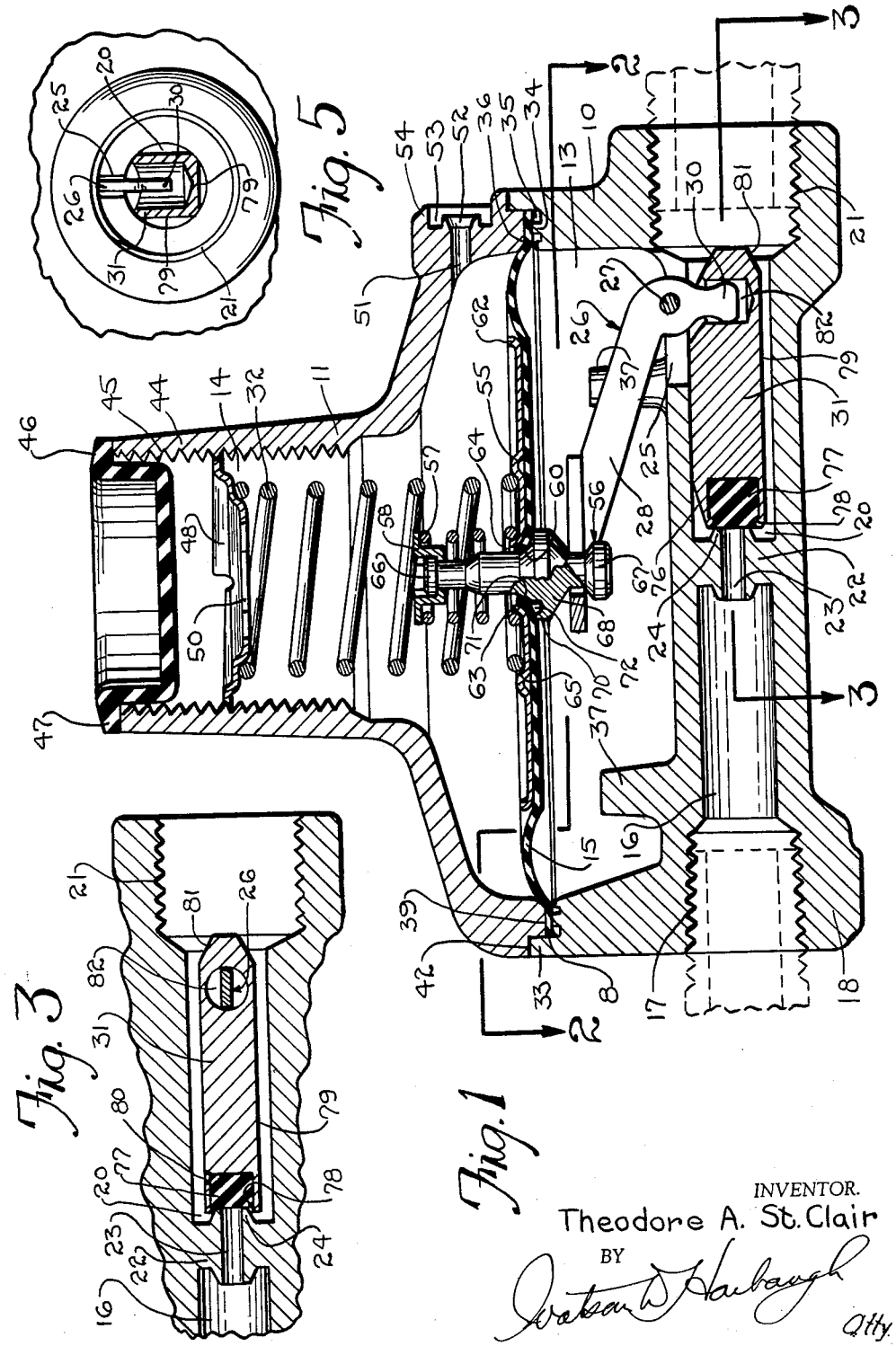

T. A. ST. CLAIR 3,090,402

GAS REGULATOR

Filed March 24, 1958

INVENTOR.
Theodore A. St.Clair
BY
Watson D Harbaugh
Atty.

United States Patent Office 3,090,402
Patented May 21, 1963

3,090,402
GAS REGULATOR
Theodore A. St. Clair, Deerfield, Ill., assignor to The Bastian-Blessing Company, Chicago, Ill., a corporation of Illinois
Filed Mar. 24, 1958, Ser. No. 723,519
6 Claims. (Cl. 137—791)

This invention relates generally to pressure reducing regulators and in particular to pressure regulators for reducing in one stage of pressure reduction a wide range of inlet pressures to a predetermined low pressure for commercial and domestic use in liquefied petroleum gas systems.

In providing a compact pressure reducing regulator which accomplishes approximately a 20% reduction in manufacturing costs and an increase in usable regulated capacity of as much as 100% for the same size diaphragm of approximately 2.75 inches in diameter yet maintains a regulated service pressure substantially constant under slow and fast flow conditions up to as much as 100 cubic feet per hour, many objects are fulfilled and many advantages are attained, some of which were unexpected, as hereinafter set forth.

Objects of the invention include a design whose components are easily and inexpensively made and assembled with minimum handling and adjustment, and, as a final rugged, dependable product is easily installed for years of trouble-free, stable performance.

A further object is to provide a straight line flow of gas through a regulator body, from the inlet to the outlet, which is substantially free of turbulence and free from lateral excursion whereby substantially the same service pressure is maintained under all delivery working conditions and different inlet pressures within the ranges experienced with conventional domestic liquefied petroleum gas dispensing systems.

A further object of the invention is to provide an improved diaphragm assembly construction in which the diaphragm is confined in a recessed seat smaller than its diameter and prestressed to arch upwardly whereby the assembly is easily connected to the valve control lever in a position with respect thereto in which the length of the lever arm is approximately the radius of the working area of the diaphragm and the plane thereof is virtually parallel to the plane of the diaphragm which is edged clamped in sealed relationship between the regulator body members in an improved manner in which a greater sensitive range of travel is attained.

The invention is characterized by an arrangement of parts whereby the lever arm is pivotally mounted at the outlet end of the regulator body with the valve plunger controlled thereby disposed inwardly of the mounting and below and parallel with the lever arm.

A further object of the invention is to provide a sensitive safety valve for low pressure service lines whose initial effective area exposed to pressures is increased slightly under excess pressure to expose a valve flow port area that is controlled by a conically-shaped valve element to provide a narrow differential between opening and closing pressures above a predetermined pressure.

The invention also contemplates a valve body made of high heat conductive metal having a long inlet passage of a diameter greater than the valve port diameter to provide an enlarged chamber disposed in heat exchange relationship with the outlet passage whereby any moisture present in the gas is trapped to freeze upon the walls of the inlet passage under icing conditions instead of at the valve port and thereby keeps the valve port open and clear.

A further object is to provide an arrangement for securing the diaphragm marginally under a predetermined clamping pressure or squeeze in a predetermined relation and attitude whereby the tightness of the securement of the bonnet to the body and its working characteristics are independent of the variable clamping pressures of assembly bolts excitable above said limit.

The invention is also characterized by a simplified valve seat arrangement in which the valve disc may be readily snapped into place upon the plunger to cooperate with the valve seat without any pressure developing therebehind that would prevent seating or permit dislodgement of the valve disc.

These being among the objects of the invention, other and further objects and advantages will become apparent from the description and the drawings relating thereto in which:

FIG. 1 is an enlarged side elevation in section of the preferred embodiment of the invention;

FIG. 3 is a section taken upon line 3—3 in FIG. 1;

FIG. 5 is an end view partially in section of the outlet opening;

Figure 7:
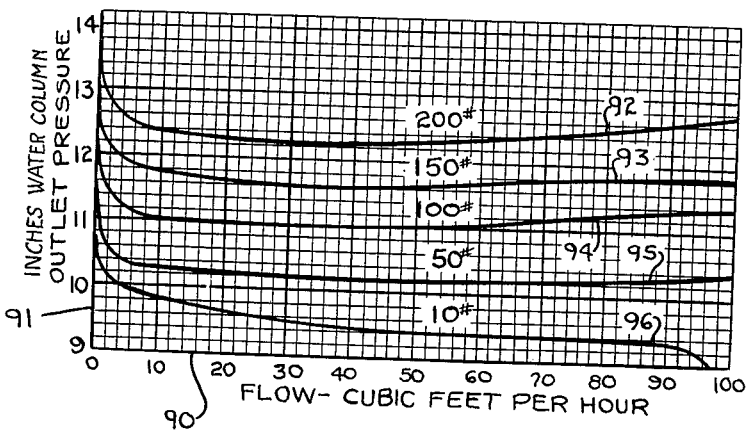
FIG. 7 is a graph of the performance characteristics of the embodiment shown in FIG. 1 based upon an inlet pressure from 10 to 200 pounds per square inch.
Figure 6:
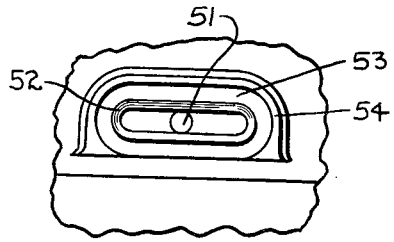
FIG. 6 is an end view of venting means in the bonnet of the regulator.
Figure 2:
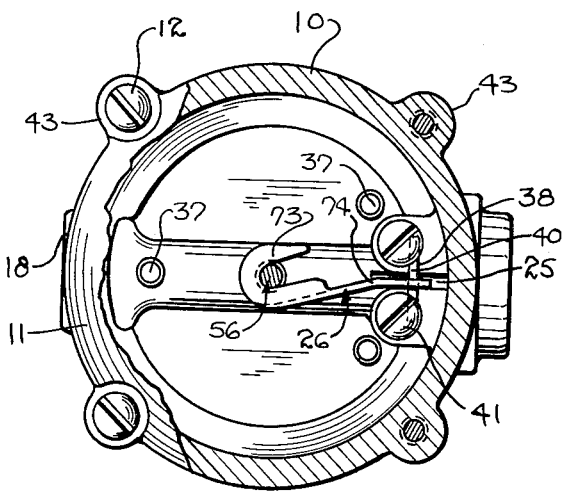
FIG. 2 is a plan view of the body of the regulator taken upon the line 2—2 in FIG. 1.
Figure 4:
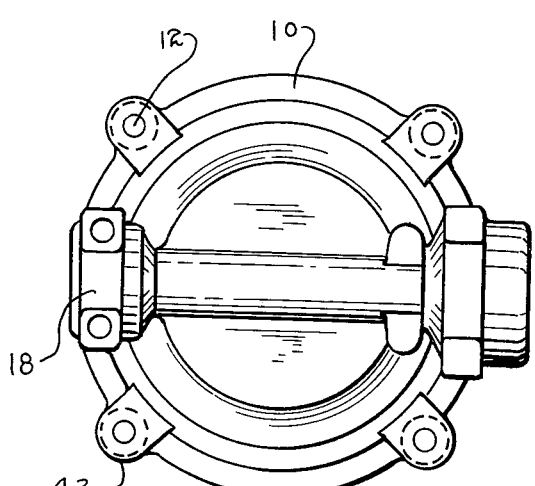
FIG. 4 is a bottom view of the embodiment shown in FIG. 1.

In the drawings the regulator essentially comprises a body 10 and a bonnet 11 marginally clamping a diaphragm 15 between them as secured by screws 12. These two members have facing cavities 13 and 14 separated from each other by the diaphragm to provide a bonnet space 14 above the diaphragm and a low pressure compartment 13 below the diaphragm. A diametral boss 18 is formed integrally with the bottom of the body 10 and a high pressure passage 16 comprising a threaded inlet opening 17 occupies approximately one half the length of the boss 18 and low pressure passage 20 threaded at its outlet opening 21 occupies the remainder of the boss 18. The two passages are separated by a cross wall 22 having a valve port 23 therethrough terminating in a valve seat 24 on the low pressure side thereof.

A slot 25 is provided in the wall of the body to interconnect the low pressure passage 20 with the low pressure compartment 13. A lever 26 is pivoted at 27 with one arm 30 thereof extending through the slot 25 into the low pressure passage where it reciprocates a valve plunger 31 therein towards and away from the valve seat 24 and the other arm 28 is connected to the diaphragm assembly for actuation thereby.

A bonnet spring 32 urges the diaphragm assembly downwardly to move the lever counter clockwise and carry the plunger 31 away from the valve seat 24. The pressure of the gas thereby admitted to the low pressure passage 20 is effective against the bottom of the diaphragm to oppose the action of the spring 32 and to urge clockwise movement of the lever to move the valve plunger to a position closing the valve port above a predetermined pressure.

Referring more particularly to the details of construction of the preferred embodiment of the invention, the body 10 comprises an aluminum die casting cored to provide the cavity 13 as bordered by a recessed seat inside a cylindrical wall 33. The seat comprises two concentric lands, an outer one 34 defining a groove 35 between it and the wall 33 in which the marginal edge 8 of the diaphragm 15 is received and an inner one 36 of approximately .015 inch less in height than the outer one.

A plurality of posts 37 upstanding from the floor are provided to prevent excessive excursion of the diaphragm assembly downwardly. The slot 25 is also cast in as well as a cross groove 38 tapered inwardly sectionally to receive a pivot pin 40 held in place by screws 41.

The bonnet has a circular base mating with the recessed seat and cylindrical wall and includes an annular clamping pad 39 telescoping within said wall 33 to a distance limited by a marginal shoulder 42 engaging the top of the wall 33. Thus the pad 39 and lands 34 and 36 are spaced predetermined distances from one another whereby conventional screws 12 located outside of the periphery of the wall and extending through matching lobes 43 upon the bonnet and body may be tightened as tight as possible to hold the bonnet on the body, yet the clamping space and pressure between the clamping pads is unchanged with respect to the diaphragm. Incidentally, locating the lobes and screws outside the confines of the wall 33 permits the diaphragm to be die cut to a clean circular form without any notches or holes therethrough. In cooperation with the pad 39 on the bottom of the bonnet the higher land 34 provides a clamping ring pad for the diaphragm under a predetermined clamping pressure while the lower land 36 barely touches the diaphragm to flatten that portion of the diaphragm bordering its working area for constant and sensitive action.

The upper part of the bonnet 11 tapers inwardly to form a circular wall 44 internally threaded at 45, and open at the top. The opening at the top of the bonnet is closed by a cap 46 made preferably of an elastomer and shaped like a cup with the bottom thereof pressed into and held in place by the crest of the threads 45 at a predetermined depth as positioned by an external flange 47 at the top thereof engaging the top of the wall 44. The cap 46 will blow free of its engagement with the bonnet top to open it completely to atmosphere if excessive pressures develop in the bonnet above the diaphragm. Otherwise the bonnet is vented to the atmosphere through an improved arrangement cast in its lower side comprising an aperture 51 terminating externally in a cavity defined by an oblong land 52 surrounded by a groove 53 and another and higher land 54. When the regulator is located with the aperture opening downwardly condensation of water in the bonnet draws out and rain and snow will not enter nor clog the aperture.

A stamped metal adjusting screw 48 with a single turn interrupted helical edge is received in the threads 45 as offset centrally as at 50 to engage in nesting relationship the upper end of the bonnet spring 32. At the other end the spring engages and acts upon the diaphragm assembly which will now be described in further detail.

The diaphragm assembly comprises a sheet of flexible material herein referred to as the diaphragm 15; a diaphragm plate 55; a diaphragm stem 56; a diaphragm safety relief spring 57; and a slotted spring retainer stamping 58. The diaphragm sheet in turn comprises an elastomer layer approximately .020" thick backed by a layer of nylon flare cloth or linen approximately .002" thick. After cohesion is established between the two layers and the elastomer cures and shrinks the area of the elastomer layer is slightly less than the area of the nylon and the diaphragm arches convexly in the direction of the fabric, which is towards the bonnet as the diaphragm is shown in the embodiment shown in the drawings. A circular hole 60 of a predetermined size is punched in the center of the diaphragm.

On top of the diaphragm 15 rests the diaphragm plate 55, which is turned upwardly at its outside edge 62 and at 63 around a center hole 64 which has a diameter greater than the diaphragm hole 60. A reinforcing circular rib 65 is preferred if drawn in the plate to serve also as a guide receiving the lower end of the bonnet spring 32.

The diaphragm plate and diaphragm are held together by the diaphragm stem 56 comprising a screw machine part having a head 66 at the top and a head 67 at the bottom end. A radial flange 68 terminating marginally in an upwardly disposed valve seal land 70 is proved above the lower head, to seat against the diaphragm 15 around the opening 60 and just above the flange 68 the stem of the diaphragm is tapered as at 71 from the bottom of the cavity 72 defined by the land 70 to a point above the openings 60 and 63. The taper is such that it bends the margin edges of the diaphragm 15 around the opening 60 up into the opening 64 in the plate to rest there with a guided closing action under the influence of the safety spring 57 resting at one end around the upturned edge 63 and held in place at the upper end by the slotted spring retainer 58 slipped into assembled position under the upper head 66.

Thus whenever the pressure in the low pressure compartment 13 forces the diaphragm 15 higher than the diaphragm stem 56 can go, the diaphragm relinquishes contact with the stem at the land 70 and at the opening 60 to vent the pressure to the bonnet space 14 and the tapered portion 71 provides for a narrow range of opening and closing pressures.

The diameter of the diaphragm 15 is greater than the inner diameter of the wall 33 by as much as .050" as measured flat, which, with the tendency to arch as described assists in causing the diaphragm to arch upwardly, in which position it is kept when clamped in place between the bonnet and body before the bonnet spring 32 is installed. This upward bow gives the diaphragm greater sensitivity in combination with its flatness where marginally restrained by the land 36.

The lever 26 operated by the diaphragm is an L-shaped heavy sheet metal stamping apertured at 27 in the heel for pivotal mounting; rounded at the toe as at 30; and provided with an arm 28 having a hook portion 73 bent into a plane parallel with pivot pin 40 and canted at 74 enough so that the center of the hook lies in the plane of the heel and toe. The pin 40 extending through the aperture 27 and held in the cross groove 38 by the screws 41 serves to mount the lever pivotally in place and the lower head 67 on the diaphragm stem 56 is slipped into the hooked portion during assembly before the bonnet 11 is secured in place.

The rounded toe 30 of the lever extends into the outlet passage 20 so that the center of the rounded portions of the toe is at the center of the passage.

The valve plunger 31 controlled by the lever comprises an elongated extrusion having flats 79 on its sides and bottom and cylindrically formed in its upper quadrant. The plunger as thus shaped sectionally is received in slidably guided relation in the outlet passage 20.

At its valve seat engaging end the outer contour is conically tapered as at 76 and recessed at its end to receive the valve seat disk 77 therein as shaped and snapped into place to be held there by an inwardly directed flange 78. At the bottom of the recess a bleed hole 80 is provided through the wall recess to eliminate any pressure built up behind the valve seat disk that might unseat it enough to vary the operating characteristics of the regulator.

The other end of the plunger is also tapered as at 81 to provide a boat tail contour for the smooth flow of fluid thereover, and just head of said other end the plunger is drilled as at 82 to provide a cavity slightly bigger in diameter than the rounded toe 30 on the lever 26. The toe 30 is received in this cavity and between them the relative movement is such that the cavity 82 is always held upright so that none of the flats 79 communicate directly with the slot 25.

Thus the arrangement is such that gas leaving the valve part 23 flows over the tapered end 76 into three segmentally shaped passageways defined by the base of the outlet passage 20 and the flats 79 and is conducted thereby right straight into the outlet opening 21 without encountering any bend or excursion creating obstructions, projections or openings that would cause even a mild turbulence. Moreover, the flow is such that it aspirates gas in the chamber 13 without pulsation through the slot 25 over the boat tail 81 more and more with greater flow rates to assist the diaphragm movement to accommodate same.

By way of understanding the significance of the embodiment described a graph (FIG. 7) is shown wherein flow rates of propane gas are plotted along the X axis 90 in cubic feet per hour and the outlet pressures are plotted against the Y axis 91 showing outlet pressures in inches of water column. The inlet pressures are identified with respect to each curve, the upper one 92 involving 200 pounds per square inch; the next curve 93 150 pounds per square inch; the next curve 94 100 pounds per square inch; the next curve 95 50 pounds per square inch; and the lower curve 96, 10 pounds per square inch.

Whereas from custom the capacity of a regulator is rated at the point where the output pressure drops below 9 inches water column with 10 pounds per square inch inlet pressure, and heretofore service pressure regulators having a 2.75" diameter diaphragm with an orifice of .067" have been rated at 50 cubic feet per hour usable capacity, the present invention provides almost 100 cubic feet per hour usable capacity with the output at all other inlet pressures showing a rising curve up to that capacity, which incidentally without being shown continue rising beyond 200 cubic feet per hour capacity. This is significant with a regulator set to deliver 30 cubic feet of gas per hour at 11 inches of water column with a hundred pound per square inch inlet pressure.

In assembling the valve, the plunger 31 is dropped into place, the lever 26 dropped into place through slot 25 with the pin 40 coming to rest in the groove 38. Screws 41 are fastened down, the lower head 67 slipped into place below the hook 73 with the diaphragm assembly dropping into place. The bonnet is then tightened into place by screws 12, the spring 32 and bonnet nut 48 installed, adjusted and the cap 46 inserted. The regulator is then ready for installation.

Having thus described the preferred embodiment of the invention and certain modifications and principles of operation it will be readily apparent to those skilled in the art how the objects and advantages mentioned are attained and how various and further changes can be made without departing from the spirit of the invention, the scope of which is commensurate with the appended claims.

What is claimed is:

1. In a pressure reducing regulator the combination of a housing having a low pressure compartment bordered by a wall, a diaphragm of a dimension whose peripheral margin fits inside said wall and comprising a fabric reinforced sheet of elastomer material of predetermined thickness, radially spaced concentric lands of different heights within said wall engaging the margin of said diaphragm the outer one of which is higher than the inner one by a fraction of the thickness of the diaphragm, and a bonnet for holding the diaphragm flat marginally at the innermost land.

2. In a pressure reducing regulator the combination of a housing having a low pressure compartment bordered by a recessed seat portion and a wall, radially spaced concentric lands of different heights on said seat portion with said wall, a diaphragm of a dimension whose peripheral margin fits inside said wall upon said lands and comprising a fabric reinforced layer and sheet of elastomer material, and a bonnet for holding the diaphragm marginally flat on the lands, the outermost land terminating from the bonnet a distance less than the thickness of the diaphragm and the shorter land being the innermost of said lands terminated from the bonnet a distance approximately the thickness of the diaphragm.

3. The combination called for in claim 2 in which said radially spaced concentric lands define a groove between them and a groove bounding the wall, and the inner marginal edges of the inner land and said marginal surface are rounded away from the diaphragm.

4. In a pressure reducing regulator the combination of a housing having a low pressure compartment bordered by a recessed seat portion and a cylindrical wall, radially spaced concentric lands of heights differing approximately .015" defining a groove between them within said wall, a fabric reinforced diaphragm of an elastomer material and approximately .022" thick marginally received inside said wall and a bonnet having a planar marginal surface rounded at its inner edge for holding the diaphragm flat marginally at the innermost land, the innermost land being the shortest in height.

5. In a pressure reducing regulator the combination of a housing having a low pressure compartment bordered by a recessed seat and an upstanding wall, radially spaced concentric lands on said seat within said wall defining a groove between them and a groove bounding the wall, innermost land having a height less than the outermost land, a thin laminated diaphragm having elastomer material surfaces, marginal portion of said diaphragm received within the wall on said lands, and a bonnet having a planar marginal surface rounded at its inner edge clamping the outer portion of the marginal portion of the diaphragm between said outer land and holding the inner portion of the marginal portion of the diaphragm in guided relationship between the innermost land to maintain the marginal portion of the diaphragm flat.

6. In a pressure reducing regulator the combination of a housing having a low pressure compartment bordered by a recessed seat and an upstanding wall, radially spaced concentric lands on said seat within said wall defining a groove between them and a groove bounding the wall, innermost land having a height approximately .015" less than the outermost land, a fabric reinforced laminated arcuate diaphragm having elastomer material surfaces, marginal portion of said diaphragm received within the wall on said lands, and a bonnet having a planar marginal surface rounded at its inner edge clamping the outer portion of the marginal portion of the diaphragm between said outer land and holding the inner portion of the marginal portion of the diaphragm in guided relationship between the innermost land to maintain the marginal portion of the diaphragm flat.

References Cited in the file of this patent

UNITED STATES PATENTS

| | | |
|---|---|---|
| 48,877 | Robbins | July 18, 1865 |
| 2,435,057 | Temple | Jan. 27, 1948 |
| 2,462,291 | Sette | Feb. 22, 1949 |
| 2,532,143 | Breit | Nov. 28, 1950 |
| 2,536,000 | Bowditch | Dec. 26, 1950 |
| 2,543,203 | Roney | Feb. 27, 1951 |
| 2,646,077 | Whitney | July 21, 1953 |
| 2,659,565 | Johnson | Nov. 17, 1953 |
| 2,661,767 | Lamb | Dec. 8, 1953 |
| 2,665,874 | MacGregor | Jan. 12, 1954 |
| 2,700,987 | Whalen | Feb. 1, 1955 |
| 2,718,373 | Henry | Sept. 20, 1955 |
| 2,744,543 | Brady | May 8, 1956 |
| 2,812,777 | Dahl | Nov. 12, 1957 |
| 2,840,003 | Johnson | June 24, 1958 |